Feb. 3, 1925.
G. S. MELCHER
1,525,082

GRADUATED VALVE FOR AUTOMATIC PRESSURE REGULATING SYSTEMS

Filed May 7, 1921    2 Sheets-Sheet 1

INVENTOR:
George S. Melcher
by Macleod, Calver, Copeland & Dike
Att'ys

Patented Feb. 3, 1925.

1,525,082

UNITED STATES PATENT OFFICE.

GEORGE S. MELCHER, OF SHARON, MASSACHUSETTS, ASSIGNOR TO CHARLES W. McCONNEL, OF BOSTON, MASSACHUSETTS; ELDON MACLEOD, OF WESTWOOD, MASSACHUSETTS; AND FANNIE B. LOOK, OF NORTHAMPTON, MASSACHUSETTS, TRUSTEES, DOING BUSINESS UNDER THE NAME OF THE MASON REGULATOR COMPANY.

GRADUATED VALVE FOR AUTOMATIC PRESSURE-REGULATING SYSTEMS.

Application filed May 7, 1921. Serial No. 467,729.

*To all whom it may concern:*

Be it known that I, GEORGE S. MELCHER, a citizen of the United States, residing at Sharon, county of Norfolk, State of Massachusetts, have invented a certain new and useful Improvement in Graduated Valves for Automatic Pressure-Regulating Systems, of which the following is a specification, reference being had therein to the accompanying drawings.

This invention relates to automatic pressure controlled valve mechanisms, and especially, although not exclusively, to throttle valve mechanisms controlled by the pressure in a steam boiler for regulating the flow of steam or other motive fluid to a blowing engine for creating a forced draft in the furnace by which said boiler is heated.

The objects and nature of the invention will be better understood from an explanation of the mechanism with which the valve embodying my invention is intended to be employed. As is well known to those skilled in the art, pressure regulators such as are shown in my prior Patent No. 1,291,063, dated January 14, 1919, are commonly employed to control the flow of steam to forced draft furnishing apparatus, and these pressure regulators have what is commonly called "compensating means," the object being to prevent sudden changes in speed of the draft fan when changes in pressure occur in the boiler, since sudden changes in the draft pressure produce uneconomical conditions in the furnace. In other words, it is desirable to change the draft conditions as little and as gradually as possible. Regulators like those shown in my said prior patent are so constructed that to obtain the most satisfactory results, the full travel of the piston should be employed, since otherwise fine regulation cannot be obtained. In practice, however, it is found that with the ordinary throttle valve employed in connection with pressure regulators of this kind, only a small part of the travel of the piston will be employed, particularly because the steam supply pipes leading to fan engines are usually designed to be much larger than is necessary, the result being that only a small opening of the throttle valve is necessary and therefore only a small portion of the stroke of the piston of the pressure regulator operating the throttle valve is employed. Accordingly, the particular object of the present invention is to provide a graduated throttle valve which can be used with steam supply pipes which are largely oversize and which can be adjusted so that the full stroke of the pressure regulator with which it is to be used will be employed.

While the valve embodying my invention is shown in the drawings in connection with a pressure regulator substantially like that shown in my prior patent, I do not limit myself to this use because the valve is capable of use under other conditions and in combination with other devices and, in fact, can be employed in many places where a throttle valve is necessary.

The foregoing and other objects of the invention, together with means whereby the same may be carried into effect, will best be understood from the following description of one form or embodiment thereof, illustrated in the accompanying drawings, wherein.

Figure 3:
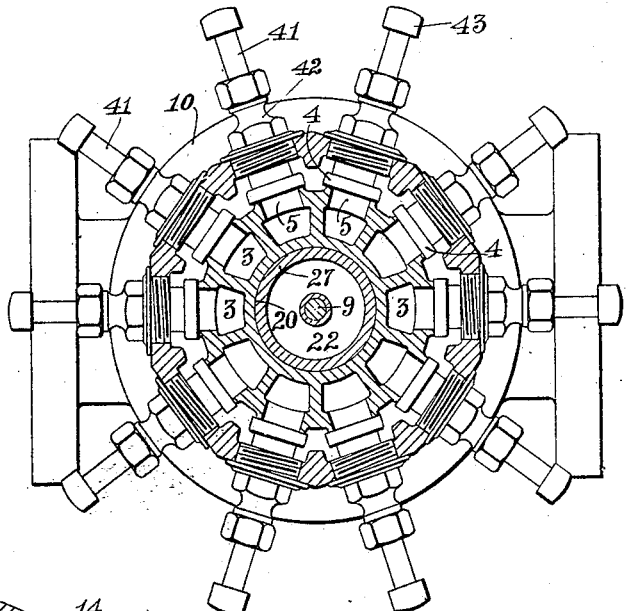
Figure 4:
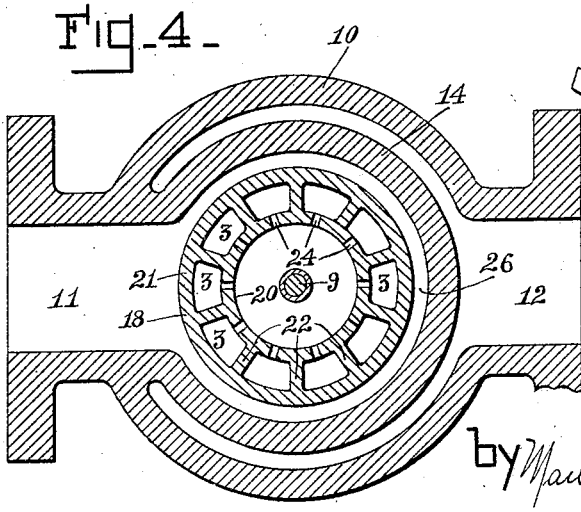
Figure 2:
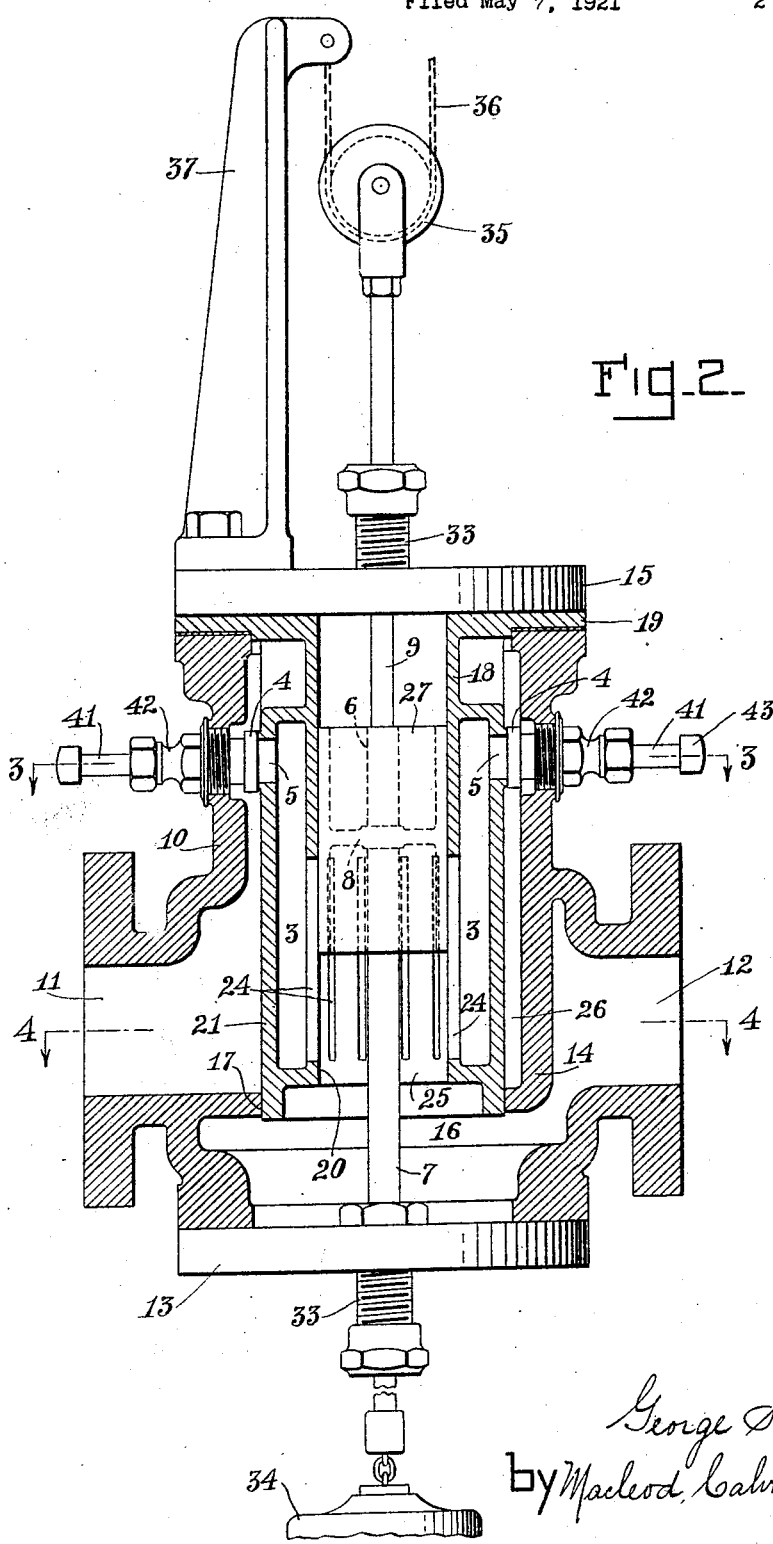
Fig. 2 is an enlarged vertical section of the throttle valve mechanism.

Figs. 3 and 4 are transverse horizontal sections taken substantially on the lines 3—3 and 4—4 of Figure 2.

Figure 1:
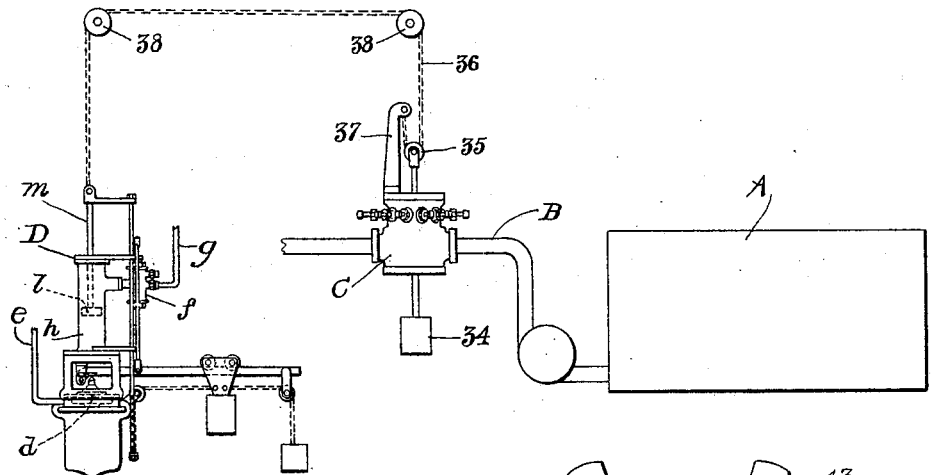
Fig. 1 is a diagrammatic view illustrating a form of apparatus including a valve constructed and arranged in accordance with the invention.

Referring to Figure 1, A denotes a fan or blowing engine for supplying a forced draft to a boiler furnace (not shown), said engine being supplied with motive fluid, preferably with steam from the boiler heated by said furnace, through a conduit B controlled by a throttle valve device C which is automatically operated by a regulator D controlled by the pressure in said boiler.

The pressure controlled regulator D may be of any suitable character but, as herein shown, is of the general type described in Letters Patent No. 1,291,063, granted to me January 14, 1919, said regulator comprising a diaphragm $d$ subjected to the boiler pressure through an inlet pipe $e$ and operating a pilot valve $f$ which controls the admission of fluid pressure (preferably water under pressure) through a pipe $g$ to a fluid pressure motor comprising a cylinder $h$ containing a piston $l$ provided with a piston rod $m$.

The throttle valve device C constituting the present invention comprises (see Figures 2, 3 and 4) an outer casing 10 connected in the conduit B, and having an inlet opening 11 and an outlet opening 12 with which the portions of said conduit at opposite sides of said casing communicate. The outer casing 10, which is closed at its lower end by a head 13, comprises a cylindrical portion 14 (see particularly Figure 4) communicating with the inlet 11 and closed at its upper end by an upper head 15. Surrounding the lower end of the cylindrical portion 14 of the outer casing is a chamber 16 communicating with the outlet 12, said chamber 16 also communicating with the cylinder 14 through a concentric opening 17 (see Figure 2) in the bottom of the latter. Within the cylindrical portion 14 of the outer casing 10, and disposed substantially concentric therewith, is a cylindrical inner casing 18 having an integral upper head 19 clamped between the head 15 and the upper end of the casing 10, the lower end of said cylindrical inner casing being seated in and substantially fitting the opening 17. The inner casing 18 is formed with concentric inner and outer annular walls 20 and 21 spaced apart and connected at intervals by radial ribs 22 to provide an annular series of longitudinal chambers or compartments 3. The chambers 3 communicate, through vertically elongated ports or slots 24 in the inner wall 20, with the space within the latter, which space is in communication through a central opening 25 in the bottom of the inner casing 18 with the chamber 16 of the outer casing 10. The outer wall 21 of the inner casing 18 is spaced from the cylindrical portion 14 of the outer casing 10 to provide an annular chamber 26 which communicates with the inlet 11.

Within the inner wall 20 of the inner casing member 18, and guided for vertical or longitudinal movement therein, is a cylindrical valve 27 adapted in its longitudinal movement to cover and uncover the slots 24 and to control the effective length thereof in accordance with the position of said valve. The valve 27 is formed with an interior spider 8 by which said valve is connected with a rod 9, being longitudinally fixed thereon by upper and lower sleeves 6 and 7 engaging opposite sides of said spider portion and pinned to said rod. The rod 9 passes through and is guided by upper and lower glands or bushings 33 carried by the upper and lower heads 15 and 13 respectively, said rod carrying at its lower end outside the casing a weight 34 and at its upper end a sheave 35 which receives a chain 36 connected at one end to an upright 37 carried by the upper head 15. The chain 36 is guided about suitably located sheaves 38 (Figure 1) and is secured at its opposite end to the piston rod $m$ of the pressure controlled regulator D, whereby movement of the piston $l$ will raise or lower the valve 27 to render effective greater or less portions of the slots 24.

Adjacent its upper end the outer wall 21 of the inner casing 18 is formed with a series of radial ports 5 disposed respectively opposite the several chambers 3 and affording communication between these chambers and the annular chamber 26. The ports 5 are controlled by radially disposed valves 4 having swivelled stems 41 in threaded engagement with bushings 42 suitably fixed, as by threaded engagement, in openings in the wall of the outer casing 10 substantially in alignment with the ports 5. The stems 41 are provided with suitable operating means, as with square or other wrench-receiving heads 43, whereby said rods and the valves 40 carried thereby may be manually operated to close the ports 5 or to open the same to any desired extent.

When the valves 4, or any one or more of them, are open, and the valve 27 raised to uncover the slots 24 or the lower ends thereof, fluid entering the annular chamber 26 through the inlet 11 will pass through the ports 5 into the chambers 3, and thence through the slots 24, opening 25 and chamber 16 to the outlet 12. The vertical position of the valve 27 will be controlled by the pressure regulator D, in accordance with the boiler pressure, to open or close the slots 24 to a greater or less extent, thereby automatically controlling the amount of motive fluid supplied through the conduit B to the engine A in accordance with the boiler pressure.

By opening or closing the valves 4, or any desired number of them, to a greater or less extent, the amount of fluid which is permitted to pass through the ports 5 from the chamber 26 to the chambers 3, and thence through the slots 24, may be manually adjusted, thereby varying the volume of flow of fluid which is subject to automatic control, and predetermining the range of operation of the automatic controlling means. By providing a series of separate chambers 3, all communicating with both the inlet and the outlet and controlled respectively by separate valves 4 which may be independently set to any desired position between that in which the ports 5 are fully open and that in which they are fully closed, it will be seen that the apparatus is capable of an extremely fine manual adjustment, so that the maximum amount of fluid which may pass the device may be regulated with extreme nicety.

It will be understood that when the valve embodying my invention is employed with an automatic regulator such as has been described in my prior patent, the valves 4 will be adjusted to give, when the throttle valve is fully open, a sufficient flow through the steam main to supply steam for the maximum duty to the blower engine. When thus set for the peculiar conditions under which the valve is to be employed, the full stroke of the automatic pressure regulator D will be employed and therefore the regulation of the speed of the blower engine will be very fine since the entire stroke of the piston is correspondingly finely subdivided by the compensating mechanism of the pressure regulator. If for any reason a change in the maximum duty of the blower engine is to be made, the throttle valve will be correspondingly readjusted.

The valve shown in the accompanying drawings and embodying my invention is composed of several parts and is thus constructed for purposes of economy because by so doing, the wearing parts of the valve are easily renewable. I do not limit myself, however, to this peculiar construction.

What I claim is:—

1. A valve device comprising a casing having inlet and outlet openings, a plurality of chambers, a plurality of ports affording communication between one of said openings and one of said chambers, a port affording communication between the other of said openings and another of said chambers, and a port or ports affording intercommunication between said chambers, separate valves for independently controlling said first named ports respectively, and a single valve for controlling said last named port or ports.

2. A valve device comprising a casing having an inlet, an outlet, and a plurality of chambers having independent communication with said inlet and outlet respectively, a plurality of manually adjustable valves for independently controlling the flow of fluid through the several chambers, and a pressure controlled valve for controlling the flow of fluid through all of said chambers.

3. A valve device comprising a casing having an inlet, an outlet and a plurality of walls having ports and enclosing a series of intercommunicating chambers one of which communicates with said inlet and another of which communicates with said outlet, a plurality of separate valves for independently controlling the ports in a wall of one of said chambers, and a single valve for controlling the port or ports in a wall of another of said chambers.

4. A valve device comprising a casing having a plurality of substantially concentric walls, webs dividing the space between two of said walls into a plurality of independent compartments, each of said walls having a port communicating with each of said compartments, separate valves for independently controlling the ports in one of said walls, and a single valve for controlling all of the ports in the other of said walls.

5. A valve device comprising a casing enclosing a plurality of inner substantially concentric walls provided with ports, the port in the innermost of said walls being longitudinally elongated, a radially disposed valve carried by said casing for controlling the port in the outermost of said inner walls, and a sliding valve within said innermost wall and guided thereby for controlling the port therein.

6. A valve device comprising a casing enclosing inner and outer substantially concentric walls, webs dividing the space between said walls into a plurality of independent compartments, each of said walls having a port communicating with each of said compartments, and the ports in said inner wall being longitudinally elongated, a plurality of radially disposed valves carried by said casing for independently controlling the ports in said outer wall, and a sliding valve within said inner wall and guided thereby for controlling all of the ports therein.

7. A valve device comprising an outer casing having end heads, an inner casing disposed substantially concentric with and spaced from the wall of said outer casing, said inner casing comprising spaced inner and outer substantially concentric walls and webs dividing the space between said walls into a plurality of independent compartments, each of said walls having a port communicating with each of said compartments, and the ports in said inner wall being longitudinally elongated, a plurality of radially disposed valves carried by said outer casing for independently controlling the ports in said outer wall, a sliding cylindrical valve within said inner wall and guided thereby for controlling all of the ports therein, and a rod guided in the end heads of said casing by which said sliding valve is carried.

8. The combination with a pressure controlled regulator, of a valve device comprising a casing having an inlet opening, an outlet opening, and a plurality of chambers having independent communication with said openings respectively, a plurality of manually adjustable valves for independently controlling communication between the several chambers and one of said openings, and another valve for controlling communication between all of said chambers and the other of said openings, and means for operatively connecting said last named valve with said regulator.

In testimony whereof I affix my signature.

GEORGE S. MELCHER.